(12) United States Patent
Pedersen et al.

(10) Patent No.: US 7,032,876 B1
(45) Date of Patent: Apr. 25, 2006

(54) FLUID VALVE

(75) Inventors: James N. L. Pedersen, Sherwood, OR (US); Steven J. Goldrich, Portland, OR (US); Stephanie J. Moehnke, Forest Grove, OR (US)

(73) Assignee: Entegris, Inc., Chask, MN (US)

( * ) Notice: Subject to any disclaimer, the term of this patent is extended or adjusted under 35 U.S.C. 154(b) by 18 days.

(21) Appl. No.: 10/630,822

(22) Filed: Jul. 29, 2003

Related U.S. Application Data

(62) Division of application No. 09/948,162, filed on Sep. 6, 2001, now Pat. No. 6,637,723.

(51) Int. Cl.
*F16K 7/18* (2006.01)
*F16K 7/07* (2006.01)

(52) U.S. Cl. ............ 251/63.4; 251/61.1; 251/331; 251/344

(58) Field of Classification Search ......... 251/61–61.5, 251/251–263, 331, 340–348
See application file for complete search history.

(56) References Cited

U.S. PATENT DOCUMENTS

| | | | |
|---|---|---|---|
| 2,858,095 A * | 10/1958 | Harris et al. ......... 251/340 |
| 3,690,344 A * | 9/1972 | Brumm ............ 251/61.1 |
| 3,787,026 A | 1/1974 | Lazar |
| 3,836,113 A | 9/1974 | Johnson |
| 4,237,931 A | 12/1980 | Rafaely |
| 4,244,554 A | 1/1981 | DiMauro et al. |
| 4,300,748 A | 11/1981 | Kreeley |
| 4,523,737 A | 6/1985 | Wentworth |
| 4,621,655 A | 11/1986 | Roche |
| 4,824,072 A | 4/1989 | Zakai |
| 4,840,191 A | 6/1989 | Gausman et al. |
| 4,925,153 A | 5/1990 | Romer |
| 4,967,791 A | 11/1990 | Sternberger |
| 5,002,086 A * | 3/1991 | Linder et al. ......... 251/61.4 |
| 5,027,857 A | 7/1991 | Champseix |
| 5,090,660 A | 2/1992 | Ratelband |
| 5,402,823 A | 4/1995 | Cole |
| 5,520,366 A | 5/1996 | Elliott |
| 5,613,517 A | 3/1997 | Handler |
| 5,706,859 A | 1/1998 | Backlund |
| 5,758,865 A | 6/1998 | Casey |
| 5,779,224 A | 7/1998 | Fukano et al. |
| 5,810,323 A * | 9/1998 | Winterer et al. ......... 251/4 |
| 5,906,353 A * | 5/1999 | Someya et al. ......... 251/331 |
| 5,924,441 A | 7/1999 | Leys et al. |
| 5,967,173 A | 10/1999 | Kingsford et al. |
| 6,003,835 A | 12/1999 | Moller |

(Continued)

OTHER PUBLICATIONS

"The New Global Standard for Abrasive, Scaling and Corrosive Slurries, Sludge, Liquids and Powders," RF Technologies, Inc., Jessup, MD, Technical Bulletin BSA Apr. 2001, 4 pgs.

(Continued)

*Primary Examiner*—Eric Keasel
(74) *Attorney, Agent, or Firm*—Patterson, Thuente, Skaar & Christensen, P.A.

(57) ABSTRACT

A valve for controlling fluid flow. The valve include a support element providing a flow path, at least a portion of the flow path extending along an axis of flow through the valve. A flexible element is compressible against the support element to interrupt the flow path and restrict fluid flow through the valve. An actuating element is movable along the axis of flow to engage and deform the flexible element against the support element.

4 Claims, 6 Drawing Sheets

U.S. PATENT DOCUMENTS

| | | |
|---|---|---|
| 6,032,690 A | 3/2000 | Weissfloch et al. |
| 6,047,943 A | 4/2000 | Hussey |
| 6,089,255 A | 7/2000 | Bonnefous et al. |
| 6,102,361 A | 8/2000 | Riikonen |
| 6,123,320 A | 9/2000 | Rasanow et al. |
| 6,182,850 B1 | 2/2001 | Marbler et al. |
| 6,216,721 B1 | 4/2001 | Perez |

OTHER PUBLICATIONS

"World Class Performance in Abrasive, Scaling and Corrosive Slurries, Liquids and Powders," RF Technologies, Inc., Jessup, MD, Technical Bulletin 0202-BE/BSA, 8 pgs., Feb. 2002.

* cited by examiner

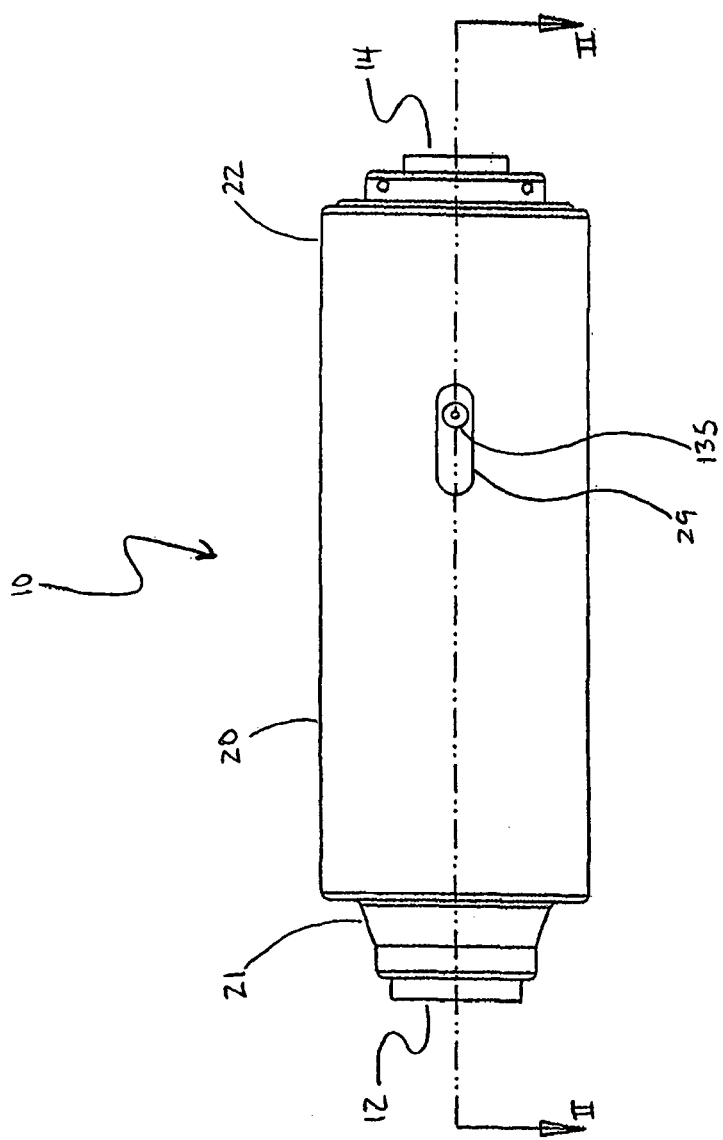
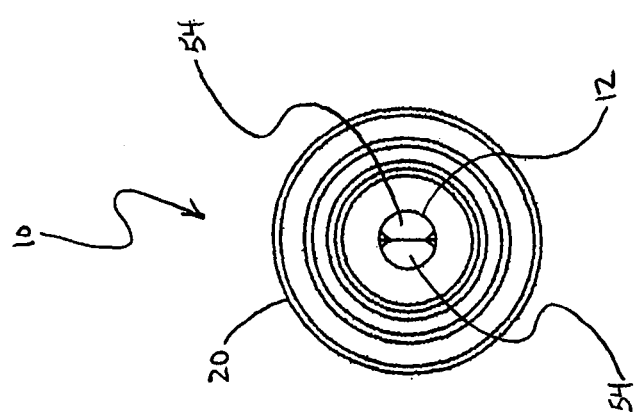

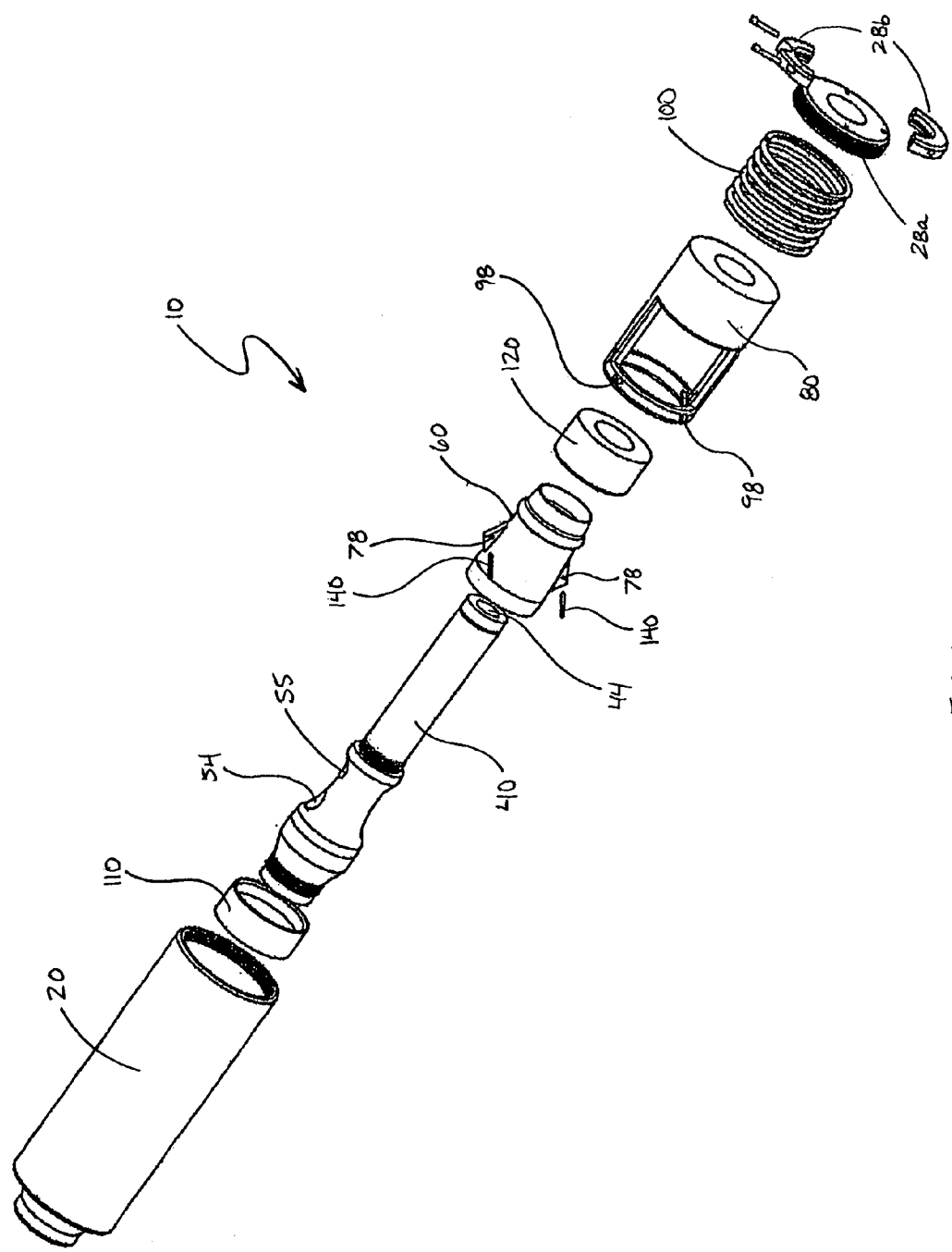

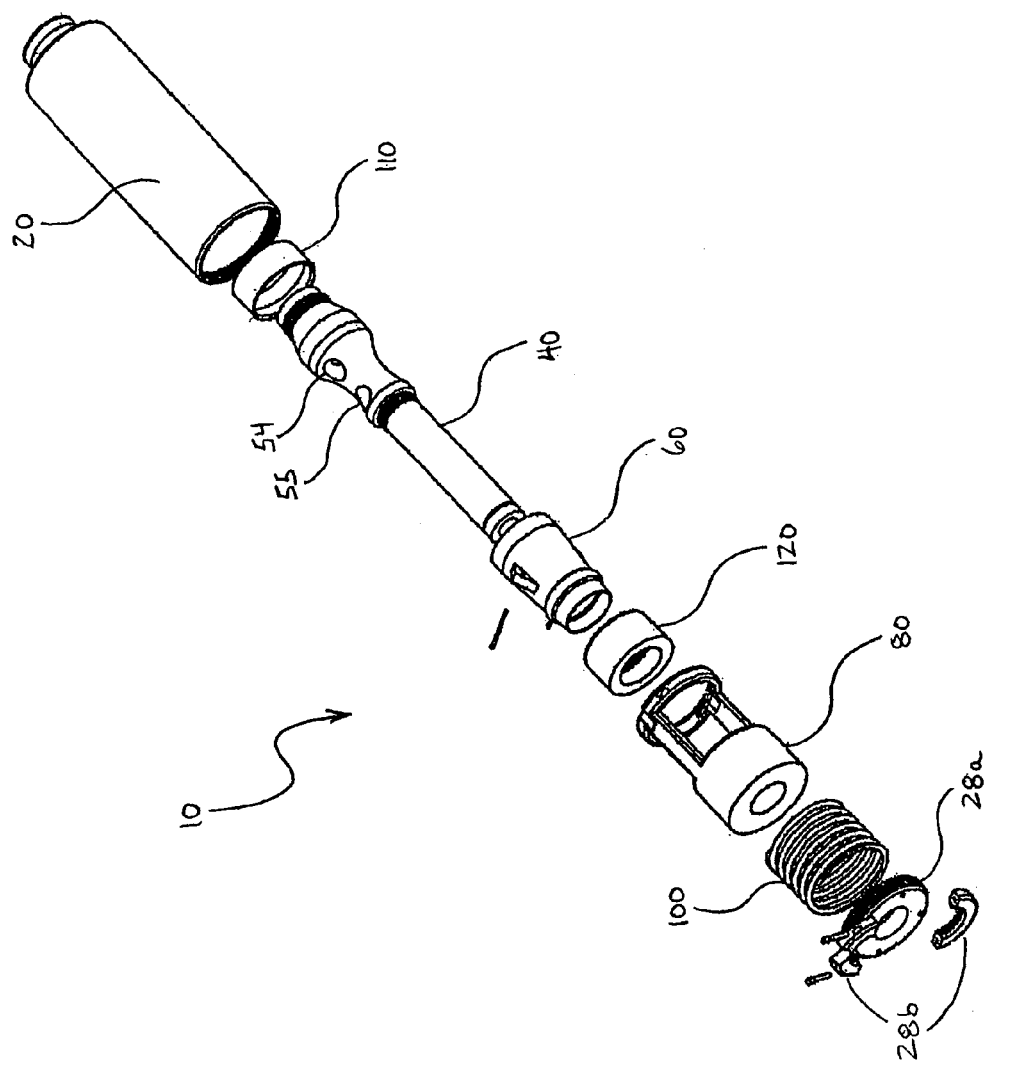

FLUID VALVE

CLAIM OF PRIORITY

This application is a divisional of U.S. application Ser. No. 09/948,162, entitled "Fluid Valve", filed Sep. 6, 2001 now U.S. Pat. No. 6,637,723.

FIELD OF THE INVENTION

The invention relates generally to fluid valves and, more particularly, to a valve having an in-line actuating element that compresses a flexible element against a support element to close the valve.

BACKGROUND OF THE INVENTION

In many fluid distribution systems—such as may be found in the semiconductor industry—fluid valves are often exposed to a variety of harsh chemicals, including acids and solvents. To withstand these harsh chemicals, a valve may be constructed of chemically resistant materials such as, for example, fluoropolymer materials. Fluoropolymer materials commonly used in the fabrication of corrosion resistant valves include PTFE (polytetrafluoroethylene), PFA (perfluoroalkoxy), and PVDF (polyvinylidene fluoride), as well as others. A wide variety of valve types fabricated from such fluoropolymer materials, as well as other corrosion resistant materials, and exhibiting high corrosion resistance are commercially available, including ball valves, diaphragm valves, poppet valves, sleeve valves, and pinch valves.

An important concern in fluid distribution systems, especially for integrated circuit manufacturers, is the generation of particulates during valve actuation, as these particulates can enter the fluid stream flowing through the valve and migrate to other portions of the fluid distribution system. Particulates suspended in a fluid may cause corrosion and abrasion of the various components (e.g., valves, flow meters, sensors, tubing) comprising a fluid distribution system and, further, such suspended particulates may contaminate production parts and materials during manufacturing, resulting in poor quality or damaged products. To minimize particulate generation, valve types exhibiting low particulate generation (e.g., diaphragm, poppet, sleeve, and pinch valves) are used to control fluid flow, while those valve types exhibiting high particulate generation (e.g., ball valves) are typically avoided.

Also of concern for many fluid distribution systems is abrasion and wear caused by the flow of slurries—e.g., abrasive slurries used in lapping processes such as chemical-mechanical planarization (CMP)—and other fluids containing abrasive particles. A typical ball valve, for example, includes one or more seals that impinge upon the valve's ball to form a seal therewith when the ball valve is in the closed condition. The material properties (e.g., low hardness) dictated by the sealing function of the seals are, in many instances, inconsistent with those characteristics (e.g., high hardness) that provide resistance to abrasion. Thus, the seals of a ball valve—as well as other components of a fluid distribution system—are often susceptible to abrasion and wear when used to control the flow of abrasive slurries.

Although diaphragm, poppet, sleeve, and pinch valves provide minimum particulate generation during actuation, as noted above, each of these valve types exhibits undesirable characteristics. All of these valves typically have a large and bulky external structure—in which, for example, the valve actuation mechanism protrudes perpendicular from the axis of flow through the valve—making it difficult to closely space a plurality of flow lines. The inability to co-locate multiple flow lines in close proximity to one another is problematic where "real estate" available for a fluid distribution system is minimal, as is often the case in semiconductor chip manufacturing facilities.

Some of the aforementioned valves, such as diaphragm and poppet valves, provide a flow path extending therethrough that exhibits multiple fluid direction changes and/or that exhibits a reduction in flow path cross-sectional area. Such fluid direction changes and flow path reductions—whether either of these characteristics is present individually or both are present in combination—provide a flow restriction that limits flow through the valve. Also, a flow path having multiple fluid direction changes may exhibit stagnant regions where fluid may become trapped.

To overcome (or avoid) the internal restrictive geometry of diaphragm and poppet valves, a common solution was to use an oversize valve (e.g., using a ¾" valve for a ½ pipe installation) in combination with adapters to install the valve. However, the use of an oversize valve increases the space necessary for installation, which is especially problematic when numerous valves must be co-located in close proximity, as noted above. Another typical solution was to altogether avoid diaphragm and poppet valves and use valves providing better flow characteristics. A type of valve providing improved flow characteristics is the ball valve but, as previously suggested, ball valves exhibit relatively high particulate generation and may also be susceptible to wear from abrasive slurries.

A conventional pinch valve comprises a flexible, tubular sleeve that is compressed, or pinched, by a mechanical actuator (e.g., a spring, a push-rod, or a combination thereof) to inhibit the flow of fluid through the tubular sleeve. Conventional sleeve valves similarly comprise a flexible, tubular sleeve that is compressed under application of, for example, hydraulic (or pneumatic) fluid pressure. Generally, for both pinch and sleeve valves, the tubular sleeve must be compressed to a fully collapsed state to close the valve. Pinch and sleeve valves provide relatively good flow characteristics (e.g., low flow restriction) and minimal particulate generation; however, each of these valve types exhibit a number of disadvantages that make them unsuitable for many applications.

Both pinch and sleeve valves operate insufficiently, or not at all, under vacuum conditions, especially for larger diameter valves that may not exhibit sufficient resiliency to overcome a vacuum and decompress without assistance. To decompress and open a pinch valve subjected to a vacuum, retraction forces (i.e., forces directed radially outward) must be applied to the outer surface of the tubular sleeve and, for large diameter pinch valves, the retraction forces required to overcome a vacuum may be relatively large. To apply such retraction forces, lugs or other grasping devices must be secured to the outer surface of the tubular sleeve, such that the pinch valve's mechanical actuator can grasp the wall of the tubular sleeve to retract and open the valve when vacuum conditions exist. The lugs are typically separate parts that must be attached to the outer surface of the tubular sleeve using a bonding or welding process. The bond between the lugs and the tubular sleeve, especially for polymer materials commonly used in corrosion resistant valves, may be relatively weak in comparison to the forces necessary to overcome a vacuum. Accordingly, severing of the bond between the lugs and tubular sleeve often occurs when a pinch valve is operated in a vacuum, resulting in a failure of the pinch valve to open. A conventional sleeve valve does not operate at all under a vacuum, as retraction forces can not be applied to the tubular sleeve by application hydraulic or pneumatic fluid pressure to the sleeve's outer surface.

The mode of actuating pinch and sleeve valves—e.g., full compression or collapse of the tubular sleeve to completely restrict fluid flow therethrough—may itself lead to a number of problems. In particular, pinch and sleeve valves may not seal completely when closed. Also, pinch and sleeve valves exhibit poor fatigue life due to the necessity of collapsing the tubular sleeve, which results in sharp bends in the wall of the sleeve. Further, due to the difficulty of fully collapsing (and decompressing) a large diameter tubular sleeve, pinch and sleeve valves are difficult to manufacture in large sizes (e.g., 1" diameter and above).

The lack of a fail safe actuation mechanism is an additional problem exhibited by some conventional fluid valves. A typical sleeve valve, for example, is open in the relaxed or uncompressed state and provides no restriction to flow. Upon compression of the sleeve valve's flexible sleeve by a hydraulic (or pneumatic) actuator that exerts fluid pressure against the flexible sleeve, the flexible sleeve deforms to a collapsed state in which fluid flow through the sleeve is restricted. However, because the sleeve valve is open in the relaxed state (i.e., normally open) and fluid pressure must be maintained against the flexible sleeve to maintain the sleeve valve in the closed condition, the sleeve valve will fail to restrict fluid flow when fluid pressure in the hydraulic actuator is lost and, accordingly, the sleeve valve is not fail safe.

SUMMARY OF THE INVENTION

A valve including a support element having a flow path extending longitudinally therethrough. At least a portion of the flow path extends along an axis of fluid flow through the valve. The valve also includes a flexible element having an open state wherein the flow path is open. The flexible element is deformable to a closed state wherein the flexible element interrupts the flow path to at least partially restrict fluid flow through the flow path. The valve further includes an actuating element having a position wherein the flexible element is at the open state. The actuating element is movable along the axis of fluid flow to another position wherein the actuating element engages the flexible element and deforms the flexible element to the closed state.

BRIEF DESCRIPTION OF THE DRAWINGS

FIG. 2 shows an elevation view of the fluid valve illustrated in FIG. 1.

FIG. 3 shows a side view of the fluid valve illustrated in FIG. 1.

FIG. 6 shows an expanded perspective view of the fluid valve illustrated in FIG. 1.

FIG. 7 shows another expanded perspective view of the fluid valve illustrated in FIG. 1.

DETAILED DESCRIPTION OF THE INVENTION

Figure 1:
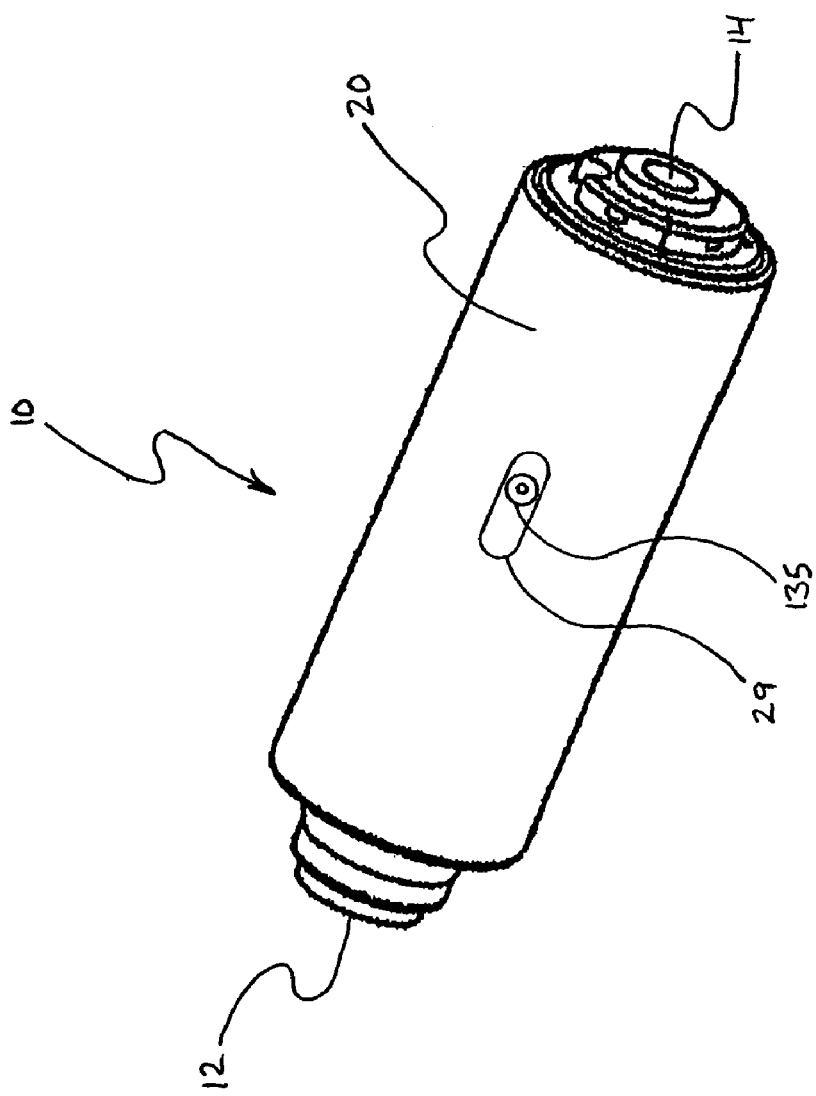
FIG. 1 shows a perspective view of an embodiment of a fluid valve according to the invention.

An exemplary embodiment of a fluid valve 10 is shown in FIGS. 1 through 7. With reference to FIGS. 1 through 3, the valve 10 includes an inlet 12 for receiving fluid and a corresponding outlet 14 that, when the valve 10 is open, exhausts fluid. The valve 10 may also include a housing 20 that, in the illustrated embodiment, is generally cylindrical; however, it should be understood that the housing may be of any suitable shape or configuration. The housing 20 has a first end 21 proximate the inlet 12 of valve 10 and an opposing second end 22 proximate the valve outlet 14. Also, the housing 20 may be constructed of any suitable material, including both ferrous and non-ferrous metals, composites, and polymer materials.

Figure 4:
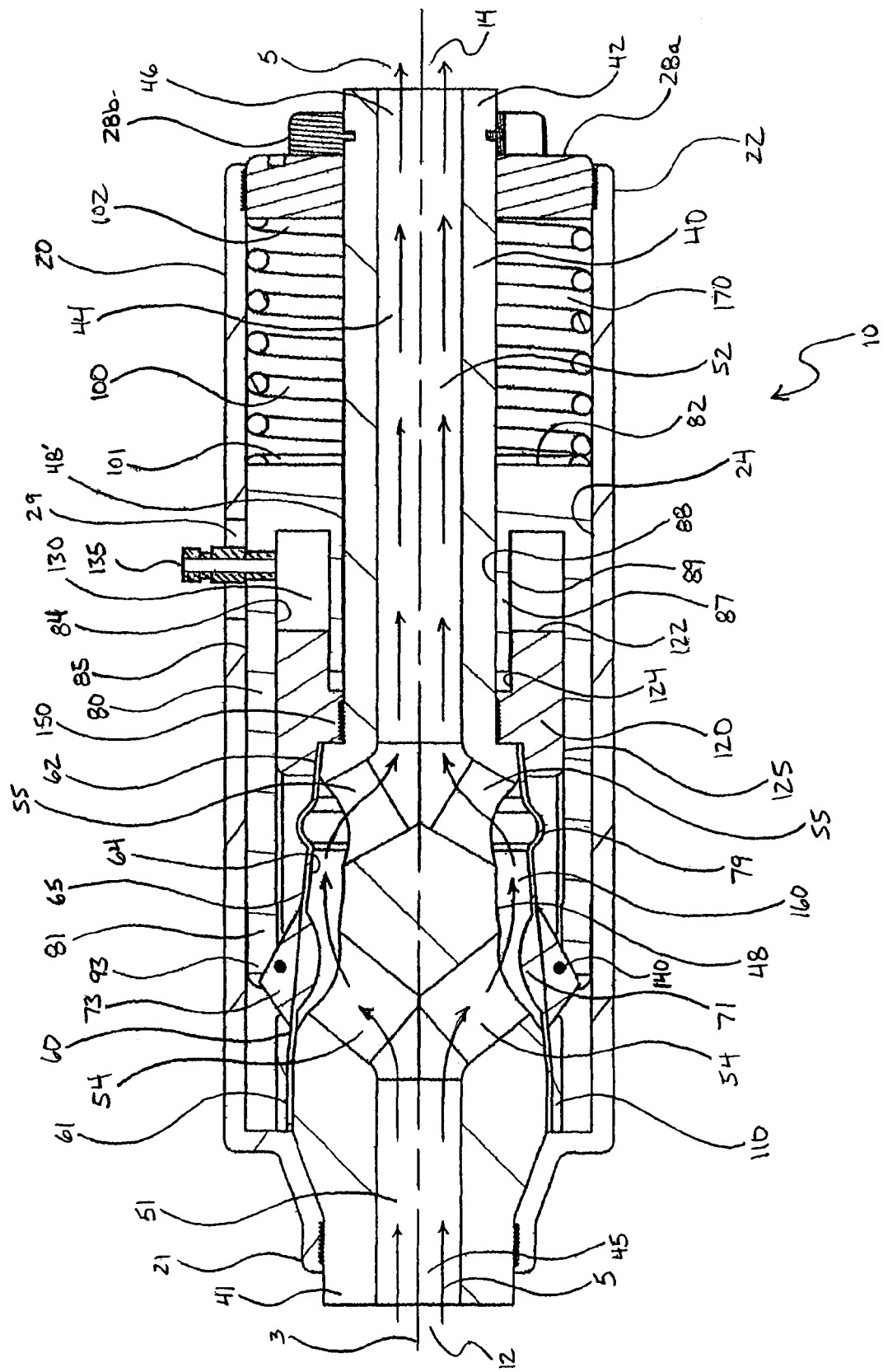
FIG. 4 shows a cross-sectional view of the fluid valve of FIG. 1 as taken along line II—II of FIG. 2, the fluid valve exhibiting an open condition.

Referring now to FIG. 4, the valve 10 includes a support element 40, a flexible element 60, and an actuating element 80. The valve 10 may also include a biasing element 100. Each of the support element 40, flexible element 60, actuating element 80, and biasing element 100 is disposed within the housing 20. The valve 10 has a longitudinal axis 3, which, in the illustrated embodiment, corresponds to a central axis of each of the support element 40, the flexible element 60, and the actuating element 80, as well as the housing 20.

The longitudinal axis 3 of valve 10 also corresponds to an axis of fluid flow through the valve 10 from the valve inlet 12 to the valve outlet 14. Although the axis of fluid flow and the longitudinal axis 3 (i.e., the central axis of the housing 20, support element 40, flexible element 60, and actuating element 80) are generally coincident in the illustrated embodiment, it should be understood that, in alternative embodiments, the axis of fluid flow may not be coincident with the longitudinal axis 3. It should also be understood that, in further embodiments, the housing 20, support element 40, flexible element 60, and actuating element 80 may not share a common central axis and, thus, may not be concentric.

The support element 40 comprises a relatively rigid—in comparison to the flexible element 60—body providing a flow path through the valve 10 and also providing a support structure for the flexible element 60. The flexible element 60, when compressed (or, more generally, when deformed), as will be explained in greater detail below, can interrupt or restrict fluid flow through the flow path of support element 40. Further, the support element 40 may provide a guide structure and/or surface for movement of the actuating element 80.

By way of example, as shown in FIGS. 1 through 7, the support element 40 may comprise a generally cylindrical body having a first end 41 coupled with the first end 21 of housing 20 and an opposing second end 42 coupled with the second end 22 of housing 20. To facilitate fabrication and assembly, an end cap 28a and lock ring 28b may be used to couple the second end 42 of the support element 40 to the housing second end 22. The support element 40 may be constructed of any suitable, relatively rigid material, including both ferrous and non-ferrous metals, composites, and polymers (e.g., fluoropolymers).

The support element 40 includes a flow path 44 extending from the first end 41 of the support element 40 to the second end 42 thereof. Proximate the first end 41 of the support element 40, the flow path 44 has an inlet 45 and, proximate the second end 42 of the support element 40, the flow path 44 has an outlet 46. The flow path inlet 45 corresponds to the inlet 12 of valve 10, whereas the flow path outlet 46 corresponds to the valve outlet 14.

The flow path 44 includes a first channel 51 extending from the first end 41 of the support element 40 towards the second end 42 thereof and terminating at one or more first ports 54. Each of the first ports 54 extends from the first channel 51 away from the longitudinal axis 3 and opens onto an outer surface 48 of the support element 40. The flow path 44 further includes a second channel 52 extending from the second end 42 of the support element 40 towards the first end 41 thereof and terminating at one or more second ports 55, each of the second ports 55 extending from the second channel 52 away from the longitudinal axis 3 and opening onto the outer surface 48. Generally, the second channel 52 has a cross-sectional area substantially the same as a cross-sectional area of the first channel 51. The sum of the cross-sectional areas of the first port(s) 54 may be substantially equal to (or greater than) the cross-sectional area of the first channel 51 and, similarly, the sum of the cross-sectional areas of the second ports 55 may be substantially equal to (or greater than) the cross-sectional area of the first channel 51.

As illustrated in FIG. 4, which shows the valve 10 in the open condition, fluid entering the flow path inlet 45 (valve inlet 12) travels through the first channel 51 to the first port or ports 54, through the first port(s) 54 and over the outer surface 48 of support element 40 to the second port or ports 55, through the second port(s) 55 to the second channel 52, and through the second channel 52 to the flow path outlet 46 (valve outlet 14). Fluid flow through the flow path 44 is denoted in FIG. 4 by arrows 5. As will be explained in greater detail below, fluid flow, from the first port(s) 54 and over the support element outer surface 48 to the second port(s) 55 is constrained or bounded by the flexible element 60 when the valve 10 is open and is restricted by the flexible element 60 when the valve 10 is closed.

The flexible element 60 comprises an elastically deformable body that, when at an open state, does not restrict fluid flow (although it may bound the fluid flow) through the flow path 44 of support element 40 and, further, that is compressible (or, more generally, deformable) to a closed state in which the flexible element 60 at least partially restricts or interrupts the flow of fluid through flow path 44. During deformation of flexible element 60 to the closed state, support element 40 provides a support structure against which the flexible element 60 may be compressed. Further, because the first port(s) 54 direct fluid flow away from the longitudinal axis 3 (i.e., the axis of fluid flow) and over the outer surface 48 of support element 40, the deformation required for flexible element 60 to engage the support element 40 and interrupt the flow path 44 is minimized.

For example, as shown in FIGS. 1 though 7, the flexible element 60 may comprise a tubular, flexible sleeve having a first end 61 coupled with the outer surface 48 of support element 40 and an opposing second end 62 also coupled with the support element outer surface 48. The flexible element 60 may be fabricated from any suitable elastically deformable material, such as molded PFA and other fluoropolymers, as well as from a combination of materials (e.g., a laminate or composite). Any suitable coupling system and/or method may be employed to couple each of the first and second ends 61, 62 of the flexible element 60 to the support element 40. For example, an overmolded collar 110 may couple the first end 61 to the support element 40, the process of overmolding being well known in the art. A threaded collar 120 may couple—via a threaded connection 150—the second end 62 of the flexible element 60 to the support element 40, the threaded collar 120 also providing one or more guide surfaces for movement of the actuating element 80, as will be explained below.

An inner surface 64 of the flexible element 60 serves as a boundary that constrains fluid flowing from the first port(s) 54 and over the outer surface 48 of the support element 40, such that fluid is directed into the second port(s) 55 and does not escape the flow path 44 of support element 40 when the valve 10 is open. The flexible element inner surface 64 and the support element outer surface 48 define (when the valve 10 is open) an annular region 160, the annular region 160 being in fluid communication with both the first port(s) 54 and the second port(s) 55. The annular region 160 may have a cross-sectional area at least substantially equal to (or greater than) the cross-sectional area of the first channel 51. When the valve 10 is closed (see FIG. 5), a portion of the inner surface 64 of flexible element 60 engages the first port(s) 54 to form a seal between the first port(s) 54 and the flexible element inner surface 64, thereby substantially restricting flow through the valve 10. An outer surface 65 of the flexible element 60 is engaged with the actuating element 80, the actuating element 80 selectively compressing and decompressing the flexible element 60 to close and open, respectively, the valve 10.

Figure 5:
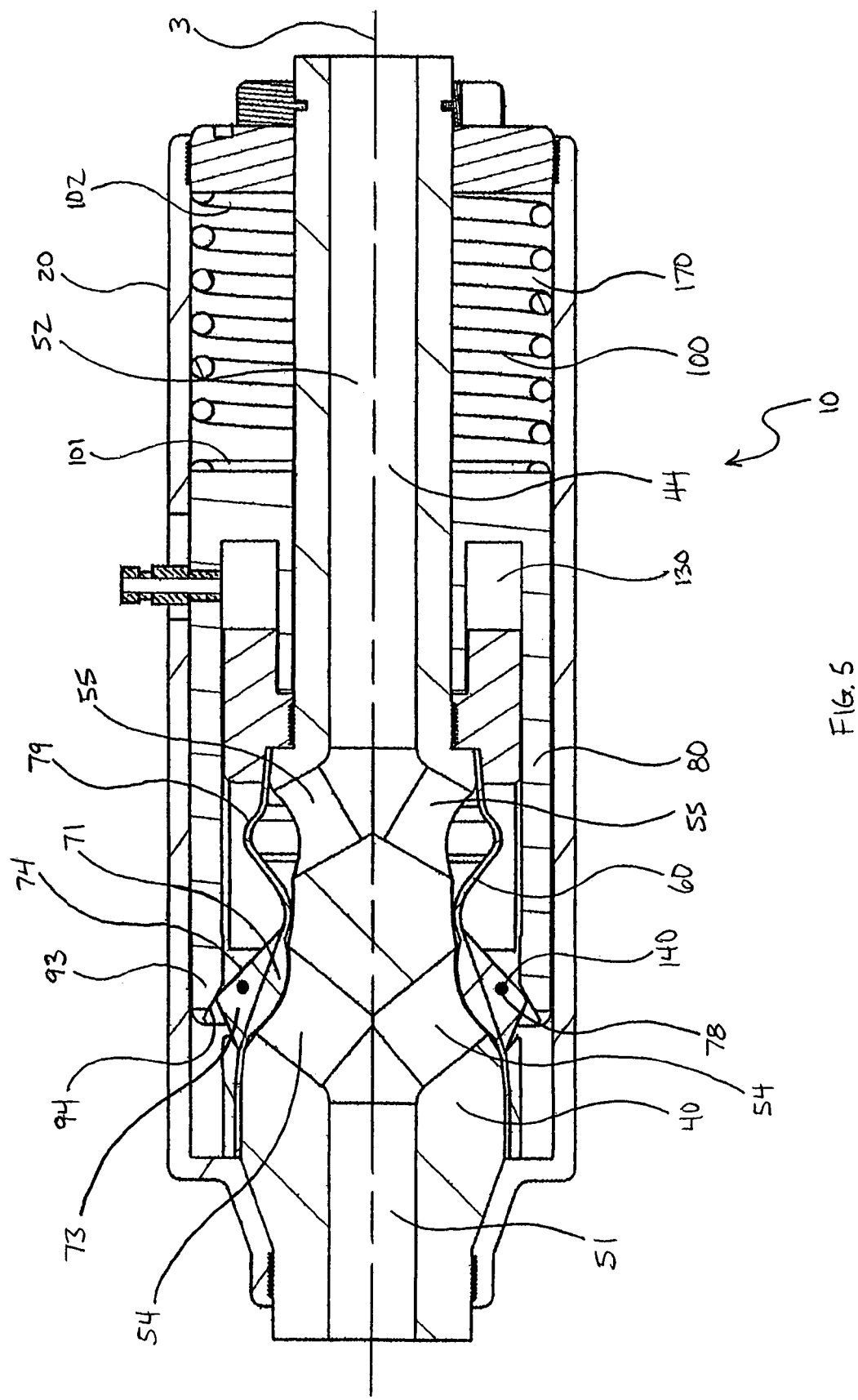
FIG. 5 shows a cross-sectional view of the fluid valve of FIG. 1 as taken along line II—II of FIG. 2, the fluid valve exhibiting a closed condition.

To enhance the seal between the inner surface 64 of flexible element 60 and the first port(s) 54 of support element 40, the inner surface 64 may include one or more seal elements 71 disposed or formed thereon. A seal element 71 may comprise any suitable body or structure adapted to create a sealing engagement between the first port(s) 54 and the flexible element inner surface 64. For example, as illustrated in FIGS. 4 and 5, the seal element 71 may comprise a raised protrusion formed on the inner surface 64. The raised protrusion may comprise a hemispherical bump configured to form a seal with a single first port 54 or, alternatively, the raised protrusion may comprise semicylindrical ridge extending about the circumference of the inner surface 64 that is configured to form a seal with multiple first ports 54.

The actuating element 80 comprises any suitable actuator exhibiting a position wherein the flexible element 60 does not seal the first port(s) 54 and the valve 10 is open. Further, the actuating element 80 is movable to another position wherein the actuating element 80 engages and compresses the flexible element 60 against the support element 40 to seal the first port(s) 54 and close the valve 10. Also, the actuating element 80 is movable along, or parallel to, the axis of flow of valve 10 (i.e., longitudinal axis 3 in the illustrated embodiment).

By way of example, as illustrated in FIGS. 1 through 7, the actuating element 80 may comprise a piston slidably disposed in the housing 20 and having an engagement end 81 to engage the outer surface 65 of the flexible element 60. The actuating element 80 also includes an opposing end 82, which may engage the biasing element 100, as will be explained below. The actuating element 80 may comprise any suitable material, including both ferrous and non-ferrous metals, composites, and polymers.

A working fluid cavity 130 is bounded by an end 122 of the threaded collar 120, an outer surface 89 of an inner cylindrical flange 87 extending from the opposing end 82 of actuating element 80 (and towards valve inlet 12), and an inner surface 84 of actuating element 80 (which extends down to the cylindrical flange 87). Working fluid may be introduced into the working fluid cavity 130 via a fluid tap 135 in fluid communication with the cavity 130 and extending out through a slot 29 in housing 20, the slot 29 allowing the fluid tap 135 to move with the actuating element 80 and relative to housing 20. The working fluid may comprise any suitable hydraulic fluid or any suitable gas, such as air or an inert gas. As will be explained in greater detail below, working fluid is injected (via fluid tap 135) into the working fluid cavity 130 to move the actuating element 80 along the axis of flow and, thereby, to open (or, optionally, to close) the valve 10.

Movement of the actuating element 80 along the axis of flow may be guided by one or more guide surfaces. For example, an inner surface 24 of the housing 20 may slidably engage an outer surface 85 of the actuating element 80. Similarly, an outer surface 125 of the threaded collar 120 may slidably engage the inner surface 84 of the actuating element 80, whereas an inner surface 124 of the threaded collar 120 may engage the outer surface 89 of the inner cylindrical flange 87 extending from opposing end 82 of actuating element 80. Also, a portion 48' of the outer surface 48 of support element 40 may slidably engage an inner surface 88 of the inner cylindrical flange 87. Each of the above-referenced surfaces (e.g., inner surface 24 of housing 20; inner and outer surfaces 124, 125 of threaded collar 120; the portion 48' of support element outer surface 48) functions as a guide surface to restrict movement of the actuating element 80 in a direction along, or parallel with, the axis of flow (e.g., longitudinal axis 3) of valve 10.

The engagement end 81 of actuating element 80 may be coupled with the outer surface 65 of the flexible element 60 by any suitable coupling system and/or method. In one embodiment, the engagement end 81 simply abuts and slides relative to the flexible element outer surface 65 and, to facilitate such a sliding engagement, one or more cam mechanisms may be employed. For example, as illustrated in FIGS. 4 through 7, a cam 93 having a cam surface 94 may be disposed on the engagement end 81 of actuating element 80, and a mating follower 73 having a follower surface 74 may be disposed on the outer surface 65 of the flexible element 60. By appropriate design of the cam and follower surfaces 94, 74, respectively, greater control over the deflection of flexible element 60 may be realized. Multiple cam mechanisms (e.g., cam 93 and follower 73) may be disposed between the actuating element engagement end 81 and the flexible element 60. For example, a cam mechanism may be used to control deflection of the flexible element 60 at locations proximate each of the first port or ports 54.

In a further embodiment, one or more pins 140 may couple the flexible element 60 with the engagement end 81 of actuating element 80. The pin(s) 140 may be provided in conjunction with, or in lieu of, one or more cam mechanism, as described above. To secure a pin 140 with the flexible element 60, any suitable mating aperture may be provided on the flexible element 60, such as the mating aperture 78 disposed on each of the followers 73. Similarly, any suitable aperture may be provided on the actuating element 80 to secure a pin 140 therewith. By way of example, a mating aperture 98 may be disposed in the engagement end 81 of actuating element 80 (see FIG. 6). One of the mating apertures 78, 98 may be formed as a slot to allow relative movement between a pin 140 and one of the flexible element 60 and the actuating element 80. Coupling the actuating element 80 with the flexible element 60 using one or more pins 140 provides a bi-directional linkage, thereby enabling the actuating element 80 to positively open and close the valve 10 under a vacuum condition (i.e., fluid pressure in flow path 44 less than a pressure outside the flow path 44). It should be understood that, in addition to pin(s) 140, any other suitable coupling mechanism (e.g., a ball-and-socket joint) may couple the engagement end 81 of actuating element 80 with the flexible element 60, so long as the coupling mechanism provides positive, bi-directional movement of the flexible element 60.

Referring to FIG. 5, which shows the valve 10 in the closed condition, the actuating element 80 has compressed the flexible element 60 against the support element 40, such that the inner surface 64 (e.g., seal element(s) 71) of flexible element 60 has engaged and sealed the first port(s) 54 on support element 40. To facilitate deflection of the flexible element 60 when fully compressed against the support element 40 and, further, to prevent fatigue related failures of the flexible element 60, the flexible element 60 may include an expansion element 79. By way of example, as shown in FIGS. 4 and 5, the expansion element 79 may comprise a semi-cylindrical ridge formed about the circumference of the flexible element 60. During compression of the flexible element 60 (see FIG. 5), the semi-cylindrical ridge of expansion element 79 expands and reduces stress within the flexible element 60.

The biasing element 100 comprises any suitable elastic body capable of biasing the actuating element 80 towards (or, optionally, away from) the flexible element 60, such that the valve 10 is normally closed (see FIG. 5). Also, the biasing element 100 is selected to provide a biasing force sufficient to maintain the valve 10 in the closed condition under the maximum expected fluid pressure in flow path 44. The biasing element 100 is further selected such that, upon introduction of the appropriate volume of working fluid (under adequate fluid pressure) into the working fluid cavity 130, the biasing force can be overcome and the valve 10 opened (see FIG. 4).

For example, as shown in FIGS. 4 through 7, the biasing element 100 may comprise a helical compression spring disposed in a cavity 170 and having a first end 101 abutting the opposing end 82 of the actuating element 80 and an opposing, second end 102 abutting the end cap 28a (or, more generally, coupled with the housing second end 22). The helical compression spring is sized to enable an adequate volume of pressurized working fluid in working fluid cavity 130 to compress the spring, while providing a biasing force sufficient to maintain the valve 10 closed when subjected to a specified maximum operating pressure.

In the illustrated embodiment of FIGS. 1 through 7, the biasing element 100 is employed to bias the actuating element 80 towards a position (e.g., towards the flexible element 60) wherein the actuating element 80 compresses the flexible element 60 to the closed state, such that the valve 10 is normally closed and is fail safe. In an alternative embodiment, however, a biasing element 100 may be employed to bias the valve 10 into the open condition (i.e., normally open). In a further embodiment, a biasing element 100 may be used standing alone and without a working fluid cavity. In this embodiment, the biasing element 100 may bias the actuating element 80 towards the position wherein the actuating element 80 deforms the flexible element 60 to the closed state, the biasing force of biasing element 100 being overcome by fluid pressure within flow path 44 (e.g., a check valve). In yet another embodiment, the valve 10 does not include a biasing element 100 and positive, bi-directional operation of the actuating element 80 can be achieved using a second working fluid cavity, such as may be formed in the cavity 170.

Operation of the valve 10 is now explained in greater detail. As noted above, in the illustrated embodiment, the valve 10 is normally closed. In the closed condition, the biasing element 100 biases the actuating element 80 to a position wherein the engagement end 81 of actuating element 80 is engaged with the outer surface 65 of flexible element 60 to compress the flexible element inner surface 64 against the outer surface 48 of support element 40. When the flexible element 60 is fully compressed against the support element outer surface 48 (i.e., the closed state of flexible element 60), the flexible element 60 seals the first port(s) 54 and restricts fluid flow through the flow path 44. One or more sealing elements 71 disposed on the flexible sleeve 60 may be employed to improve the seal between the flexible element inner surface 64 and the support element outer surface 48 at the first port(s) 54.

To open the valve 10, working fluid is injected into the working fluid cavity 130 via fluid tap 135. As working fluid is supplied to the working fluid cavity 130, the working fluid cavity 130 will expand and move the actuating element 80 along the axis of flow towards another position (e.g., away from the flexible element 60 or rightward in FIG. 5) while also compressing the biasing element 100. When an appropriate volume of working fluid has been provided to the working fluid cavity 130, the actuating element 80 will be fully retracted and the engagement end 81 of actuating element 80 will no longer compress the inner surface 65 of flexible element 60 against the outer surface 48 of support element 40 at the first port(s) 54. The flexible element 60—due to its own elastic resiliency and/or due to the force exerted through pin(s) 140—may then move away from the support element outer surface 48, wherein the flexible element 60 no longer restricts fluid flow through the flow path 44 of support element 40 (i.e., the open state of flexible element 60) and the valve 10 is opera. It should be understood that, when the valve 10 is open (e.g., flexible element 60 at the open state), the engagement end 81 of actuating element 80 may still be engaged with the flexible element 60. For example, a surface of engagement end 81 (e.g., cam surface 94) may abut a surface (e.g., follower surface 74) of flexible element 60 and/or a pin or pins 140 may couple the actuating element 80 with the flexible element 60.

If a vacuum exists in flow path 44—wherein the pressure acting on inner surface 64 of flexible element 60 is less than the pressure acting on the outer surface 65 thereof—the resiliency (i.e., the ability to return to an initial and/or undeformed state) of the flexible sleeve 60 may be insufficient to overcome the pressure differential created by the vacuum. The valve 10, however, may be adapted using pin(s) 140, or other suitable coupling mechanism, to operate under a vacuum condition, as noted above. A pin (or pins) 140 coupled with a mating aperture (e.g. a hole or slot) 78 on the flexible element 60 and also coupled with a mating aperture (e.g., a hole or slot) 98 on the actuating element 80 provides positive, bi-directional deflection of the flexible element 60. Stated another way, as the actuating element 80 is retracted towards a position wherein the valve 10 is open, the actuating element 80—in conjunction with the pin(s) 140—exerts a retraction force on the flexible element 60, thereby "pulling" the flexible element 60 away from the outer surface 48 of support element 40.

While the valve 10 is open, fluid enters the flow path 44 at flow path inlet 45 and flows through the first channel 51 toward the flow path outlet 46, as illustrated by arrows 5 in FIG. 4. Fluid in the first channel 51 flows into the first port(s) 54, the first port(s) 54 directing the fluid away from the axis of flow (e.g., longitudinal axis 3) and over the outer surface 48 of the support element 40 to the second port(s) 55. Fluid flowing over the outer surface 48 of support element 40 is bounded by the inner surface 64 of flexible element 60. The second port(s) 55 direct fluid back towards the axis of flow and into the second channel 52, and fluid flows through the second channel 52 towards the flow path outlet 46, where fluid is exhausted from the valve 10.

To again close the valve 10, the working fluid is released (via fluid tap 135) from the working fluid cavity 130. As the working fluid is exhausted from the working fluid cavity 130, the biasing element 100 will exert a biasing force against the actuating element 80, causing the actuating element 80 to again move to a position (see FIG. 4) wherein the valve 10 is in the closed condition. Once again, when the valve 10 is closed, the actuating element engagement end 81 engages and compresses the flexible element 60, such that the inner surface 64 of the flexible element 60 seals off the first port(s) 54 of flow path 44. During engagement (and relative movement) between the actuating element 80 and the flexible element 60, the engagement end 81 of actuating element 80 may include a cam 93 having a cam surface 94 that slidably engages a follower surface 74 of a follower 73 on flexible element 60, as described above.

An exemplary embodiment of a valve 10—as well as numerous alternative embodiments—having been herein described, those of ordinary skill in the art will appreciate the advantages thereof. Because the actuating element 80 is mounted in-line with the axis of flow through the valve 10 and is movable along this axis, the valve 10 exhibits a small form factor—i.e., transverse dimension (diameter) divided by the longitudinal dimension (length)—in comparison to conventional valves, making the valve 10 suitable for closely spaced installations. Further, a biasing element 100 may bias the actuating element 80 to a position such that the valve 10 is normally closed and fail safe.

The valve 10 does not exhibit any substantial directional changes in fluid flow since the flow path 44 through support element 40 runs substantially straight along the axis of flow (i.e., longitudinal axis 3) with only a minor deviation, as fluid is directed through the first port(s) 54 and over the support element outer surface 48 to the second port(s) 55. Also, the valve 10 does not exhibit any significant variation in cross-sectional area of the flow path 44. Accordingly, due to the lack of directional changes and area reductions in the flow path 44, the valve 10 provides a low flow resistance. Further, the internal geometry of valve 10 minimizes regions of stagnant flow, thereby preventing fluid trapping.

Because the flexible element 60 is not fully collapsed to close the valve 10 but, rather, is minimally compressed against the support element 40, no sharp bends will be formed in the flexible element 60, thereby extending the fatigue life of the valve 10 and improving reliability. Further, due to positive, bi-directional operation of the flexible element 60, the valve 10 can function under a vacuum. In addition, because the flexible element 60 deforms a relatively small amount in comparison to prior art valves and, further, because the flexible element 60 is driven in a positive, bi-directional manner, the valve 10 can be manufactured in any suitable size, including relatively larger sizes in comparison to conventional valves.

The valve 10 is suitable for use with any type of fluid, whether in the liquid or gas state. Through appropriate selection of materials for the support element 40 and flexible element 60, the valve 10 may be used to control the flow of corrosive fluids as well as abrasive slurries. The valve 10 is, however, not limited to use for the distribution of corrosive and/or abrasive fluids, as the valve 10 may also be used for controlling the flow of relatively inert liquids and gases.

The foregoing detailed description and accompanying drawings are only illustrative and not restrictive. They have been provided primarily for a clear and comprehensive understanding of the present invention and no unnecessary limitations are to be understood therefrom. Numerous additions, deletions, and modifications to the embodiments described herein, as well as alternative arrangements, may be devised by those skilled in the art without departing from the spirit of the present invention and the scope of the appended claims.

What is claimed is:

1. A valve comprising:

a support element including a longitudinally extending flow path, at least a portion of the flow path extending along an axis of fluid flow;

a flexible element having an open state wherein the flow path is open, the flexible element deformable to a closed state wherein the flexible element interrupts the flow path to at least partially restrict fluid flow through the flow path;

the support element passing through an actuating element, the actuating element having a position wherein the flexible element is at the open state, and the actuating element movable along the axis of fluid flow to another position wherein the actuating element deforms the flexible element radially inward to the closed state; and a coupling mechanism coupling the actuating element with the flexible element, the coupling mechanism causing the actuating element to deform the flexible element from the closed state to the open state when fluid pressure within the flow path is less than a pressure outside the flow path, the coupling mechanism comprising a pin, the pin coupled with a first mating aperture in the flexible element and further coupled with a second mating aperture in the actuating element.

2. The valve of claim 1, further comprising a cam mechanism slidably coupling the actuating element with the flexible element.

3. The valve of claim 1, further comprising a biasing element to bias the actuating element towards said another position.

4. The valve of claim 1, further comprising a generally cylindrical housing to encase the support element, the flexible element, the actuating element, and the coupling mechanism, the cylindrical housing having an axis substantially concentric with the axis of fluid flow.

* * * * *

UNITED STATES PATENT AND TRADEMARK OFFICE
CERTIFICATE OF CORRECTION

| | | |
|---|---|---|
| PATENT NO. | : 7,032,876 B1 | Page 1 of 1 |
| APPLICATION NO. | : 10/630822 | |
| DATED | : April 25, 2006 | |
| INVENTOR(S) | : James N.L. Pedersen, Steven J. Goldrich and Stephanie J. Moehnke | |

It is certified that error appears in the above-identified patent and that said Letters Patent is hereby corrected as shown below:

Col. 9, line 31, delete "opera" and insert --open--

Signed and Sealed this

Fifth Day of December, 2006

JON W. DUDAS
*Director of the United States Patent and Trademark Office*